(12) United States Patent
Nicol, II et al.

(10) Patent No.: US 11,520,871 B2
(45) Date of Patent: Dec. 6, 2022

(54) AUTHENTICATION WITH FACE COVERING

(71) Applicant: International Business Machines Corporation, Armonk, NY (US)

(72) Inventors: William Bruce Nicol, II, Durham, NC (US); Lakshminarayanan Srinivasan, Cary, NC (US); Peter Yim, Raleigh, NC (US); David De-Hui Chen, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 17/015,216

(22) Filed: Sep. 9, 2020

(65) Prior Publication Data

US 2022/0075861 A1 Mar. 10, 2022

(51) Int. Cl.
*G06F 21/00* (2013.01)
*G06F 21/36* (2013.01)
*G06F 21/32* (2013.01)
*G06V 40/16* (2022.01)

(52) U.S. Cl.
CPC .............. *G06F 21/36* (2013.01); *G06F 21/32* (2013.01); *G06V 40/166* (2022.01); *G06V 40/172* (2022.01); *G06F 2221/2113* (2013.01)

(58) Field of Classification Search
CPC .. G06F 21/36; G06F 21/32; G06F 2221/2113; G06V 40/166; G06V 40/172
See application file for complete search history.

(56) References Cited

U.S. PATENT DOCUMENTS

| 9,098,760 | B2 | 8/2015 | Saito | |
|---|---|---|---|---|
| 10,169,646 | B2 | 1/2019 | Ganong | |
| 10,275,672 | B2 | 4/2019 | Zhang | |
| 10,984,225 | B1 * | 4/2021 | Ghosh | G06V 40/171 |
| 2007/0036398 | A1 * | 2/2007 | Chen | G06V 40/172 |
| | | | | 382/118 |
| 2008/0313939 | A1 * | 12/2008 | Ardill | G09F 3/02 |
| | | | | 40/329 |

(Continued)

OTHER PUBLICATIONS

Anonymous et al., "A Framework for Responsible Limits on Facial Recognition Use Case: Flow Management", World Economic Forum, Switzerland, Feb. 2020, 20 Pages.

(Continued)

*Primary Examiner* — Brandon Hoffman
*Assistant Examiner* — William A Corum, Jr.
(74) *Attorney, Agent, or Firm* — Stephanie L. Carusillo

(57) ABSTRACT

In an approach to augmenting authentication methods using a face covering, one or more computer processors receive an image of a user wearing a face covering, where a portion of the face of the user is visible in the image, and the face covering covers another portion of the face of the user in the image. One or more computer processors detect an identifier operably coupled with the face covering. One or more computer processors determine whether the first portion of the face of the user is associated with the identifier. In response to determining the first portion of the face of the user is not associated with the identifier, one or more computer processors receive an alternate authentication. One or more computer processors authenticate the user.

20 Claims, 4 Drawing Sheets

(56) References Cited

U.S. PATENT DOCUMENTS

| | | | | |
|---|---|---|---|---|
| 2015/0186965 | A1* | 7/2015 | Paul | G06Q 30/0613 |
| | | | | 235/494 |
| 2016/0234023 | A1* | 8/2016 | Mozer | H04L 9/3231 |
| 2016/0267617 | A1* | 9/2016 | Hunt | G16H 10/65 |
| 2019/0042866 | A1* | 2/2019 | Mostafa | G06V 40/171 |
| 2019/0370533 | A1 | 12/2019 | Han | |
| 2020/0042770 | A1* | 2/2020 | Yan | G06V 40/168 |
| 2021/0326579 | A1* | 10/2021 | Harris | G06V 40/172 |
| 2022/0067132 | A1* | 3/2022 | Learmonth | G06F 21/32 |
| 2022/0075862 | A1* | 3/2022 | Torre | H04W 12/06 |

OTHER PUBLICATIONS

Anonymous et al., "Unlock iPhone With Face Mask Seamlessly After New Update: iOS 13.5 Release Imminent", News 18 Tech, May 19, 2020, 2 Pages.

Authors et al. Disclosed Anonymously, "Method and System for Improving Face Recognition and Identification Using Eye Gaze Tracking", An IP.com Prior Art Database Technical Disclosure, IP.com No. IPCOM000260522D, IP.com Electronic Publication Date: Dec. 2, 2019, 4 Pages.

Authors et al. Disclosed Anonymously, "Method to identify subjects in a photo without using facial recognition analysis", An IP.com Prior Art Database Technical Disclosure, IP.com No. IPCOM000236679D, IP.com Electronic Publication Date: May 8, 2014, 5 Pages.

Baqeel et al., "Face detection authentication on Smartphones: End Users Usability Assessment Experiences", 2019 International Conference on Computer and Information Sciences (ICCIS), IEEE, Saudi Arabia, Apr. 3-4, 2019, 6 Pages.

Lin, Yunting, "Face Recognition for Access Control with Visual PIN", An IP.com Prior Art Database Technical Disclosure, IP.com No. IPCOM000254503D, Copyright: Honeywell International In., IP.com Electronic Publication Date: Jul. 6, 2018, 5 Pages.

Ng, Alfred, "Facial recognition firms are scrambling to see around face masks", CNET, May 15, 2020, 6 Pages.

Wright, Elias, "The Future of Facial Recognition Is Not Fully Known: Developing Privacy and Security Regulatory Mechanisms for Facial Recognition in the Retail Sector", Fordham Intellectual Property, Media and Entertainment Law Journal, vol. 29 XXIX, No. 2, Article 6, 2019, 77 Pages.

* cited by examiner

AUTHENTICATION WITH FACE COVERING

BACKGROUND OF THE INVENTION

The present invention relates generally to the field of electronic authentication, and more particularly to augmenting authentication methods using a face covering.

Electronic authentication is the process of establishing confidence in user identities electronically presented to an information system. Digital authentication or e-authentication may be used synonymously when referring to the authentication process that confirms or certifies a person's identity. When used in conjunction with an electronic signature, electronic authentication can provide evidence of whether data received has been tampered with after being signed by its original sender. Electronic authentication can reduce the risk of fraud and identity theft by verifying that a person is who they say they are when performing transactions online or in person in a retail store.

Multi-factor authentication is an authentication method in which a computer user is granted access only after successfully presenting two or more pieces of evidence (or factors) to an authentication mechanism, where the factors can include knowledge (something the user and only the user knows), possession (something the user and only the user has), and inherence (something the user and only the user is).

SUMMARY

Embodiments of the present invention disclose a method, a computer program product, and a system for augmenting authentication methods using a face covering. The method may include one or more computer processors receiving an image of a user wearing a face covering, where a portion of the face of the user is visible in the image, and the face covering covers another portion of the face of the user in the image. One or more computer processors detect an identifier operably coupled with the face covering. One or more computer processors determine whether the first portion of the face of the user is associated with the identifier. In response to determining the first portion of the face of the user is not associated with the identifier, one or more computer processors receive an alternate authentication. One or more computer processors authenticate the user.

DETAILED DESCRIPTION

For various reasons, including health, weather, and religious, partial covering of the face may be required or advised. For example, the wearing of personal protective equipment, such as a surgical mask or a face shield, can obstruct portions of a user's face during daily activities. In such environments, facial recognition software may not be a viable means of authentication. Embodiments of the present invention recognize that efficiency may be gained by providing a mechanism that will enable authentication even if a portion of a user's face is obstructed. Implementation of embodiments of the invention may take a variety of forms, and exemplary implementation details are discussed subsequently with reference to the Figures.

Figure 1:
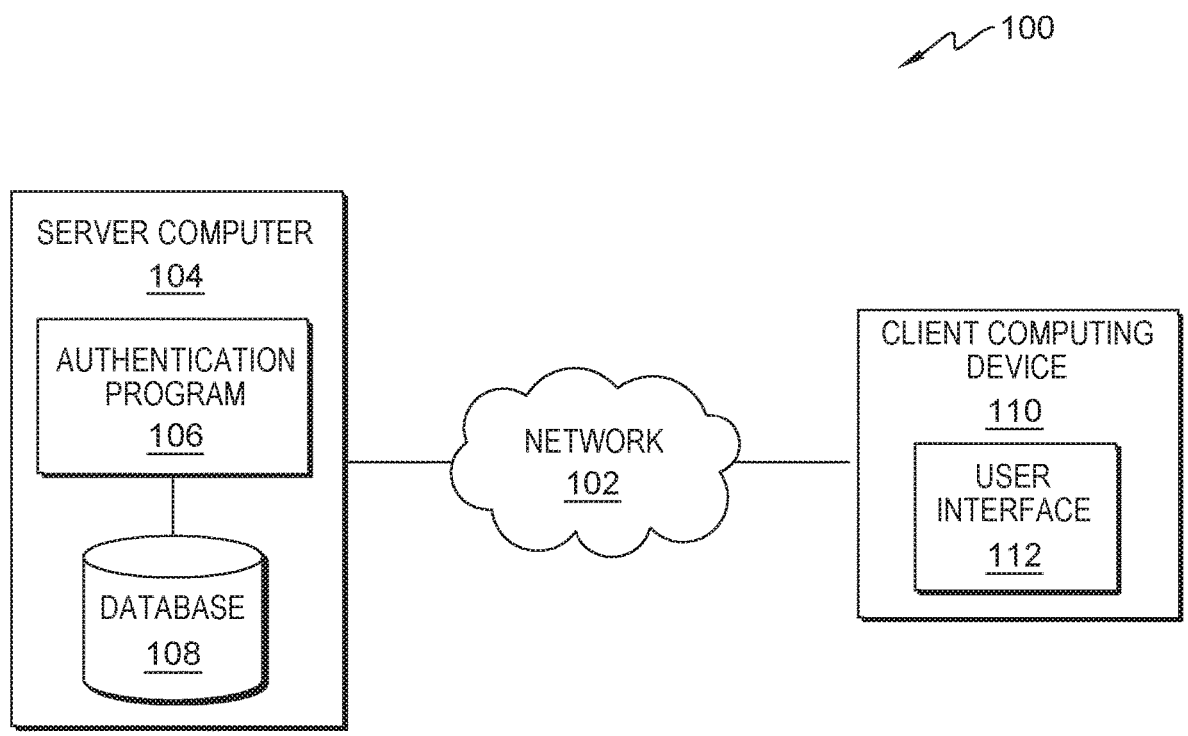
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104 and client computing device 110, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks capable of receiving and transmitting data, voice, and/or video signals, including multimedia signals that include voice, data, and video information. In general, network 102 can be any combination of connections and protocols that will support communications between server computer 104, client computing device 110, and other computing devices (not shown) within distributed data processing environment 100.

Server computer 104 can be a standalone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, or any programmable electronic device capable of communicating with client computing device 110 and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 includes authentication program 106 and database 108. Server computer 104 may include internal and external hardware components, as depicted and described in further detail with respect to FIG. 4.

Authentication program 106 uses a unique methodology for augmenting authentication mechanisms, such as facial recognition, by linking ordinary objects with personal identity to provide strong authentication. In the depicted embodiment, authentication program 106 resides on server computer 104. In another embodiment, authentication program 106 may reside on client computing device 110 or elsewhere in distributed data processing environment 100. In the depicted embodiment, authentication program 106 is a standalone program. In another embodiment, authentication program 106 may be integrated as a component of a facial recognition software program, not shown. In a further embodiment, authentication program 106 may include a facial recognition component. Authentication program 106 receives an image of a user wearing a face covering. Authentication program 106 detects an identifier on the face covering. Authentication program 106 determines whether the face in the image is associated with the face covering. If authentication program 106 determines the face is not associated with the face covering, then authentication program 106 receives an alternate authentication and associates the face with the face covering and authenticates the user. Authentication program 106 is depicted and described in further detail with respect to FIG. 2.

Database 108 is a repository for data used by authentication program 106. Database 108 can represent one or more databases. In the depicted embodiment database 108 resides on server computer 104. In another embodiment, database 108 may reside elsewhere within distributed data processing environment 100, provided authentication program 106 has access to database 108. A database is an organized collection of data. Database 108 can be implemented with any type of storage device capable of storing data and configuration files that can be accessed and utilized by authentication program 106, such as a database server, a hard disk drive, or a flash memory. Database 108 stores a corpus of content associated with a user's identification, including, but not limited to, a name, an address, a phone number, an email address, an image of the user, an employer, a social media affiliation, a credit card number, one or more authentication identifiers, such as a fingerprint image or a passcode, etc. Database 108 may also store face covering identifiers in association with a user that owns the face covering.

The present invention may contain various accessible data sources, such as database 108, that may include personal data, content, or information the user wishes not to be processed. Personal data includes personally identifying information or sensitive personal information as well as user information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. Authentication program 106 enables the authorized and secure processing of personal data. Authentication program 106 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Authentication program 106 provides information regarding personal data and the nature (e.g., type, scope, purpose, duration, etc.) of the processing. Authentication program 106 provides the user with copies of stored personal data. Authentication program 106 allows the correction or completion of incorrect or incomplete personal data. Authentication program 106 allows the immediate deletion of personal data.

Client computing device 110 can be one or more of a laptop computer, a tablet computer, a smart phone, a smart watch, a smart speaker, or any programmable electronic device capable of communicating with various components and devices within distributed data processing environment 100, via network 102. Client computing device 110 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In one embodiment, the wearable computer may be in the form of a head mounted display. The head mounted display may take the form-factor of a pair of glasses. In an embodiment, the wearable computer may be in the form of a smart watch or a smart tattoo. In an embodiment, client computing device 110 may be integrated into a vehicle of the user. For example, client computing device 110 may include a heads-up display in the windshield of the vehicle. In general, client computing device 110 represents one or more programmable electronic devices or combination of programmable electronic devices capable of executing machine readable program instructions and communicating with other computing devices (not shown) within distributed data processing environment 100 via a network, such as network 102. Client computing device 110 includes an instance of user interface 112.

User interface 112 provides an interface between authentication program 106 on server computer 104 and a user of client computing device 110. In one embodiment, user interface 112 is mobile application software. Mobile application software, or an "app," is a computer program designed to run on smart phones, tablet computers and other mobile devices. In one embodiment, user interface 112 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 112 enables a user of client computing device 110 to input authentication data used by authentication program 106, such as an image of the user, a fingerprint of the user, a passcode, etc. User interface 112 also enables the user of client computing device 110 to input user profile data. User interface 112 also enables the user of client computing device 110 to associate or register an image of the user with an identifier of a face covering worn by the user.

Figure 2:
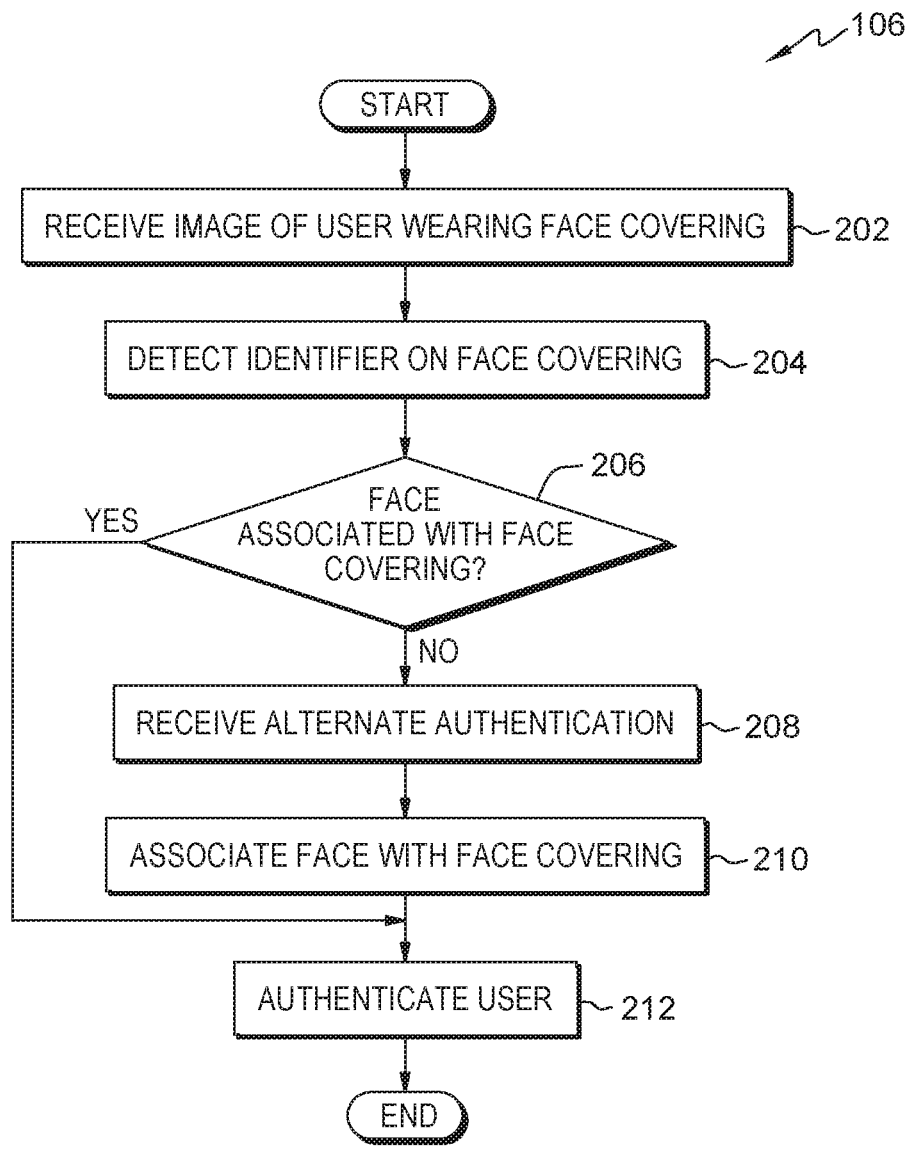
FIG. 2 is a flowchart depicting operational steps of an authentication program, on a server computer within the distributed data processing environment of FIG. 1, for augmenting authentication methods using a face covering, in accordance with an embodiment of the present invention.

FIG. 2 is a flowchart depicting operational steps of authentication program 106, on server computer 104 within distributed data processing environment 100 of FIG. 1, for augmenting authentication methods using a face covering, in accordance with an embodiment of the present invention.

Authentication program 106 receives an image of a user wearing a face covering (step 202). In an embodiment, when a user of client computing device 110 takes an image of the face of the user while wearing a face covering with a camera associated with client computing device 110 (not shown), and the user sends the image, via user interface 112, authentication program 106 receives the image from the user. In the received image, a first portion of the face of the user is visible and the face covering covers a second portion of the face of the user. For example, if a user of client computing device 110 uses facial recognition for authentication for use of client computing device 110, then the user may display the face of the user to client computing device 110, and authentication program 106 receives the image of the face of the user. In another example, a business or government entity may require authentication via facial recognition for entry to a building, and for that authentication, the user of client computing device 110 displays the face of the user to a camera associated with the entity. In an embodiment, the face covering covers, or obstructs, a portion of the visible face of the user. For example, the face covering may be a mask or other personal protective equipment, such as worn by a health care worker or other individuals for protection from breathing or expelling a virus or bacteria. In another example, the face covering may one used for religious or modesty purposes. In a further example, the face covering may be any item that partially blocks a user's face, including, but not limited to, glasses, sunglasses, a hat, a protective helmet, a scarf or other protection from the weather, etc.

Authentication program 106 detects an identifier on the face covering (step 204). In an embodiment, authentication program 106 detects a unique identifier operably coupled with the face covering in the received image of the user. In one embodiment, the manufacturer of the face covering adds the identifier to the face covering during the manufacturing process of the face covering. In another embodiment, the user of client computing device 110 may purchase the identifier separately from the face covering and attach the identifier to the face covering. In a further embodiment, the user may create the identifier. In an embodiment, the identifier is attached to the face covering such that the user can detach the identifier and re-attach the identifier to a different face covering. In one embodiment, the identifier may be a barcode or quick response (QR) code from which authentication program 106 can retrieve metadata. In another embodiment, the identifier may be a unique set of numbers. In one embodiment, the identifier has an associated expiration component such that the identifier cannot be used in perpetuity, or so that the user has to re-register the identifier, enabling additional security. For example, the identifier may be a single-use identifier. In another example, the identifier may expire after a certain time period or date.

Authentication program 106 determines whether the face is associated with the face covering (decision block 206). In an embodiment, authentication program 106 compares the detected identifier with identifiers stored in database 108 to determine whether the identifier is associated with an image of the user or user profile stored in database 108. In an embodiment, the user of client computing device 110 registers the identifier on the face covering with an image of the face of the user, via user interface 112, to create an association between the user and the face covering. In another embodiment, authentication program 106 uses facial recognition software to determine an identity of the user based on the uncovered portion of the face of the user in the image, for example, the eyes of the user, and searches the user profile of the identified user for a match to the detected identifier on the face covering.

If authentication program 106 determines the face is not associated with the face covering ("no" branch, decision block 206), then authentication program 106 receives an alternate authentication (step 208). In an embodiment where authentication program 106 does not find an association between the user of client computing device 110 and the detected identifier on the face covering, authentication program 106 determines that an alternate means of authentication is needed. For example, if authentication program 106 determines the face of the user is not associated with the face covering identifier, then authentication program 106 may request an alternate authentication from the user, such as a fingerprint, a passcode, or a spoken word or phrase to be used with voice recognition. In response to requesting an alternate authentication, authentication program 106 receives the alternate authentication, via user interface 112. In one embodiment, authentication program 106 determines the alternate authentication matches an authentication registration in the user profile stored in database 108.

Authentication program 106 associates the face with the face covering (step 210). In an embodiment, in response to receiving the alternate authentication, and thereby confirming the identity of the user, authentication program 106 associates the image of the face with the identifier on the face covering and stores the association in database 108. In one embodiment, the association of the face of the user with the face covering identifier serves as a registration for the face covering identifier.

Responsive to associating the face with the face covering, or if authentication program 106 determines the face is associated with the face covering ("yes" branch, decision block 206), then authentication program 106 authenticates the user (step 212). In an embodiment, once authentication program 106 establishes an association between the user and the face covering, authentication program 106 authenticates the user. For example, if a user of client computing device 110 uses facial recognition software, which includes authentication program 106 as a component, for authentication for use of client computing device 110, then the user may display the face of the user including the face covering and the identifier coupled to the face covering to client computing device 110, and authentication program 106 authenticates the user and enables client computing device 110 to unlock. In another example, if a user of client computing device 110 uses facial recognition software, which includes authentication program 106 as a component, for authentication for entry into a building, then the user may display the face of the user including the face covering and the identifier coupled to the face covering to a security camera of the building entrance, and authentication program 106 authenticates the user and enables the security system of the building to grant access to the user.

Figure 3:
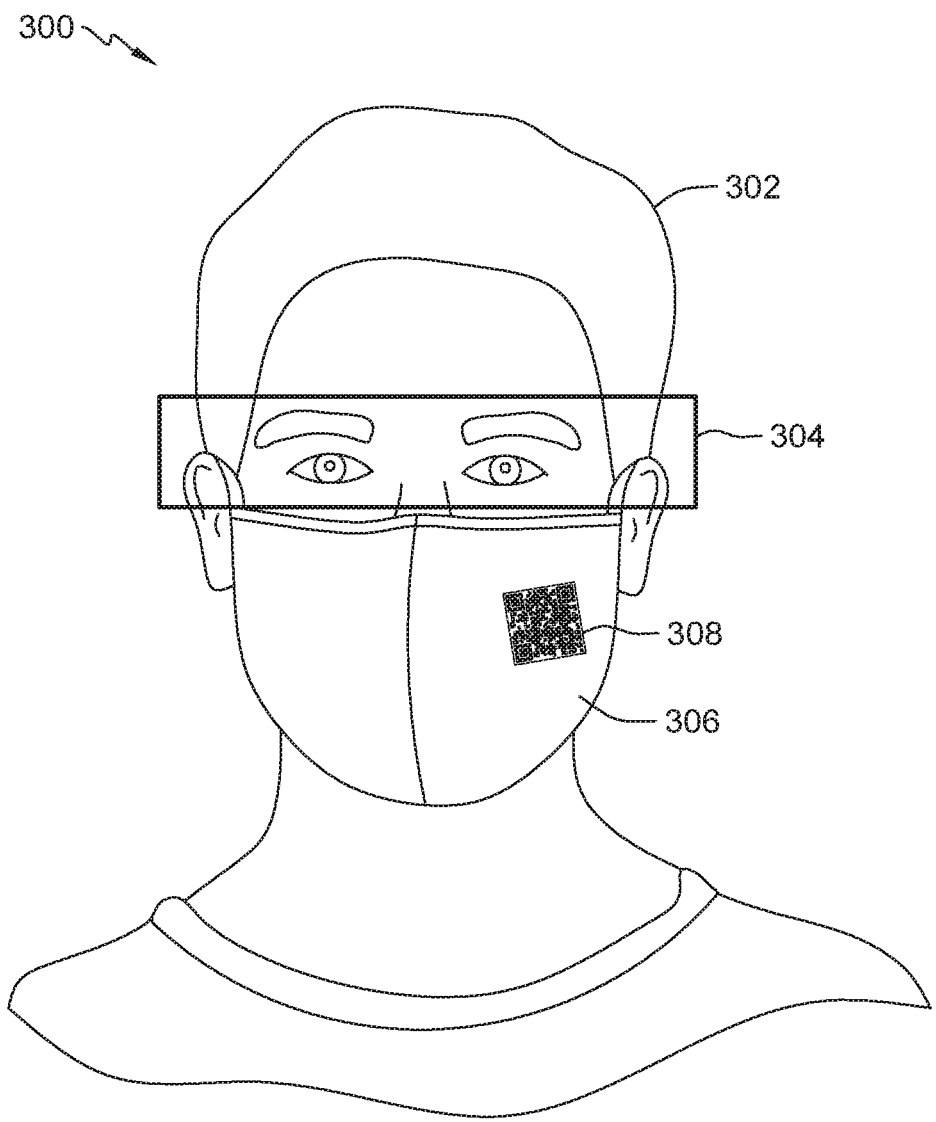
FIG. 3 illustrates an example of a face covering with a coded identifier, in accordance with an embodiment of the present invention.

FIG. 3 illustrates example 300 of a face covering with a coded identifier, in accordance with an embodiment of the present invention. FIG. 3 includes user 302 wearing face covering 306. Identifier 308 is a QR code attached to face covering 306. Area 304 displays the uncovered portion of the face of user 302. As described with respect to FIG. 2, authentication program 106 receives an image of the user which displays area 304 and face covering 306. After detecting identifier 308, authentication program 106 determines an association exists between the image of user 302 and identifier 308, and authentication program 106 authenticates user 302.

Figure 4:
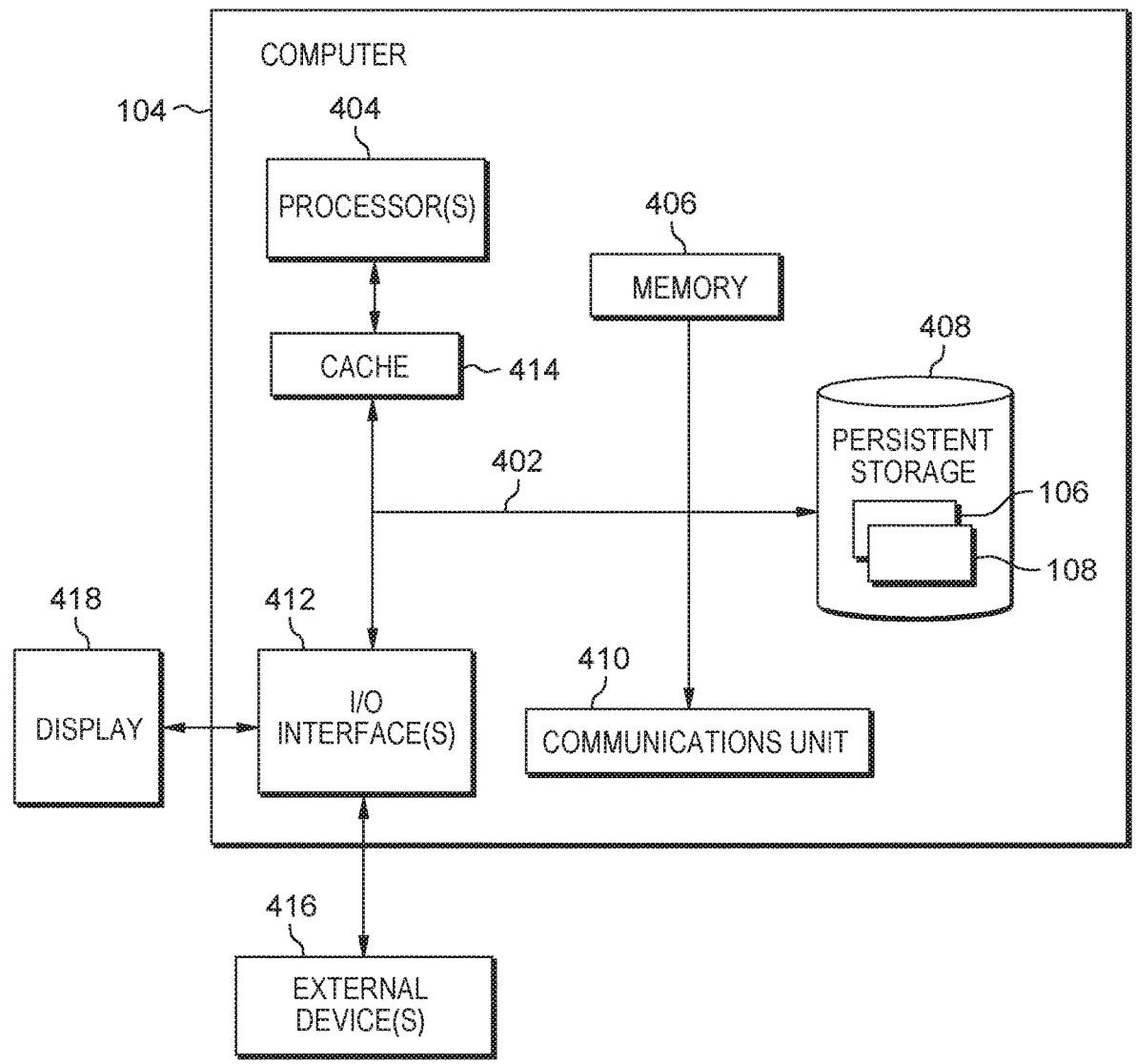
FIG. 4 depicts a block diagram of components of the server computer executing the authentication program within the distributed data processing environment of FIG. 1, in accordance with an embodiment of the present invention.

FIG. 4 depicts a block diagram of components of server computer 104 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Server computer 104 can include processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., authentication program 106 and database 108, are stored in persistent storage 408 for execution and/or access by one or more of the respective processor(s) 404 of server computer 104 via cache 414. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of client computing device 110. In these examples, communications unit 410 includes one or more network interface cards. Communications unit 410 may provide communications through the use of either or both physical and wireless communications links. Authentication program 106, database 108, and other programs and data used for implementation of the present invention, may be downloaded to persistent storage 408 of server computer 104 through communications unit 410.

I/O interface(s) 412 allows for input and output of data with other devices that may be connected to server computer 104. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention, e.g., authentication program 106 and database 108 on server computer 104, can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor. Display 418 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
receiving, by one or more computer processors, an image of a user wearing a face covering, wherein a first portion of the face of the user is visible in the image, and wherein the face covering covers a second portion of the face of the user in the image;
detecting, by one or more computer processors, an identifier operably coupled with the face covering;
determining, by one or more computer processors, whether the first portion of the face of the user is associated with the identifier, wherein determining the first portion of the face of the user is associated with the identifier is a first authentication;
responsive to determining the first portion of the face of the user is not associated with the identifier, receiving, by one or more computer processors, a second authentication;
authenticating, by one or more computer processors, the user using the second authentication; and
receiving, by one or more computer processors, a registration of the identifier from the user to create an association between the user and the face covering.

2. The computer-implemented method of claim 1, further comprising:
responsive to receiving the second authentication, associating, by one or more computer processors, the first portion of the face of the user with the face covering.

3. The computer-implemented method of claim 1, wherein the identifier is added to the face covering by a manufacturer of the face covering.

4. The computer-implemented method of claim 1, wherein authenticating the user comprises:
responsive to determining the first portion of the face of the user is associated with the identifier, authenticating, by one or more computer processors, the user.

5. The computer-implemented method of claim 1, wherein the second authentication is one or more of a fingerprint and a passcode.

6. The computer-implemented method of claim 1, wherein the identifier is selected from the group consisting of a barcode, a quick response (QR) code, and a unique set of numbers.

7. The computer-implemented method of claim 1, wherein the identifier is operably coupled with the face covering such that the user can detach the identifier from the face covering and re-attach the identifier to a different face covering.

8. A computer program product comprising:
one or more computer readable storage media and program instructions collectively stored on the one or more computer readable storage media, the stored program instructions comprising:
program instructions to receive an image of a user wearing a face covering, wherein a first portion of the face of the user is visible in the image, and wherein the face covering covers a second portion of the face of the user in the image;
program instructions to detect an identifier operably coupled with the face covering;
program instructions to determine whether the first portion of the face of the user is associated with the identifier, wherein the program instructions to determine the first portion of the face of the user is associated with the identifier is a first authentication;
responsive to determining the first portion of the face of the user is not associated with the identifier, program instructions to receive a second authentication;
program instructions to authenticate the user using the second authentication; and
program instructions to receive a registration of the identifier from the user to create an association between the user and the face covering.

9. The computer program product of claim 8, the stored program instructions further comprising:
responsive to receiving the second authentication, program instructions to associate the first portion of the face of the user with the face covering.

10. The computer program product of claim 8, wherein the identifier is added to the face covering by a manufacturer of the face covering.

11. The computer program product of claim 8, wherein the program instructions to authenticate the user comprise:
responsive to determining the first portion of the face of the user is associated with the identifier, program instructions to authenticate the user.

12. The computer program product of claim 8, wherein the second authentication is one or more of a fingerprint and a passcode.

13. The computer program product of claim 8, wherein the identifier is selected from the group consisting of a barcode, a quick response (QR) code, and a unique set of numbers.

14. The computer program product of claim 8, wherein the identifier is operably coupled with the face covering such that the user can detach the identifier from the face covering and re-attach the identifier to a different face covering.

15. A computer system comprising:
one or more computer processors;
one or more computer readable storage media;
program instructions collectively stored on the one or more computer readable storage media for execution by at least one of the one or more computer processors, the stored program instructions comprising:
program instructions to receive an image of a user wearing a face covering, wherein a first portion of the face of the user is visible in the image, and wherein the face covering covers a second portion of the face of the user in the image;
program instructions to detect an identifier operably coupled with the face covering;
program instructions to determine whether the first portion of the face of the user is associated with the identifier, wherein the program instructions to determine the first portion of the face of the user is associated with the identifier is a first authentication;
responsive to determining the first portion of the face of the user is not associated with the identifier, program instructions to receive a second authentication;
program instructions to authenticate the user using the second authentication; and
program instructions to receive a registration of the identifier from the user to create an association between the user and the face covering.

16. The computer system of claim 15, the stored program instructions further comprising:
responsive to receiving the second authentication, program instructions to associate the first portion of the face of the user with the face covering.

17. The computer system of claim 15, wherein the identifier is added to the face covering by a manufacturer of the face covering.

18. The computer system of claim 15, wherein the program instructions to authenticate the user comprise:
responsive to determining the first portion of the face of the user is associated with the identifier, program instructions to authenticate the user.

19. The computer system of claim 15, wherein the second authentication is one or more of a fingerprint and a passcode.

20. The computer system of claim 15, wherein the identifier is operably coupled with the face covering such that the user can detach the identifier from the face covering and re-attach the identifier to a different face covering.

* * * * *